Dec. 5, 1950            T. THOMAS            2,532,966

WHEELBARROW BOOSTER

Filed Sept. 16, 1949

Tom Thomas
INVENTOR.

BY *Clarence A. O'Brien*
*and Harvey B. Jacobson*
Attorneys

UNITED STATES PATENT OFFICE 2,532,966

WHEELBARROW BOOSTER

Tom Thomas, Houston, Tex.

Application September 16, 1949, Serial No. 116,139

1 Claim. (Cl. 280—52)

This invention relates to wheelbarrows, and more particularly to an attachment for a wheelbarrow adapted to aid those using a wheelbarrow in moving it over rough terrain.

The object of this invention is to provide an attachment for a wheelbarrow which will aid in moving a loaded wheelbarrow over uneven terrain obstacles thereon, such as scrap lumber, small holes, ditches, or mounds of earth.

A further object of the invention is to provide a wheelbarrow booster that is simple in construction and easy to manufacture, strong, durable and efficient in operation, relatively cheap in cost, and readily and easily used.

Figure 1:
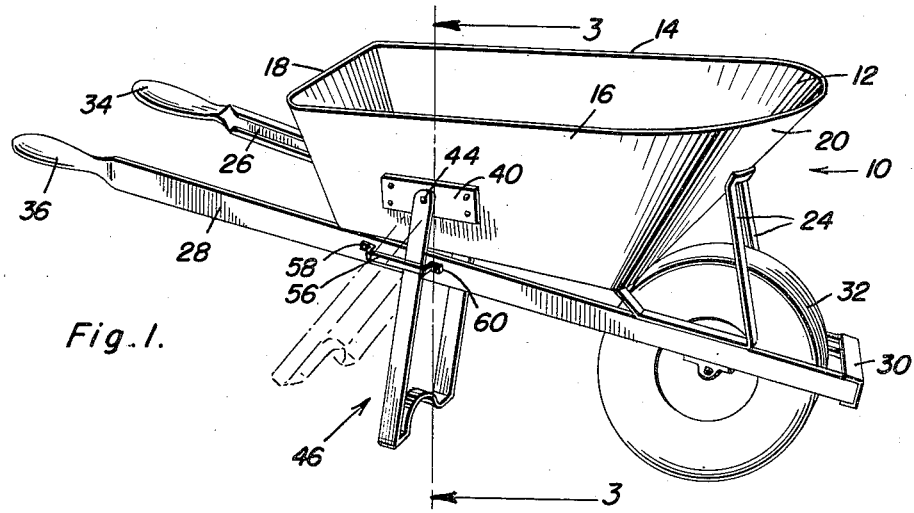
Figure 2:
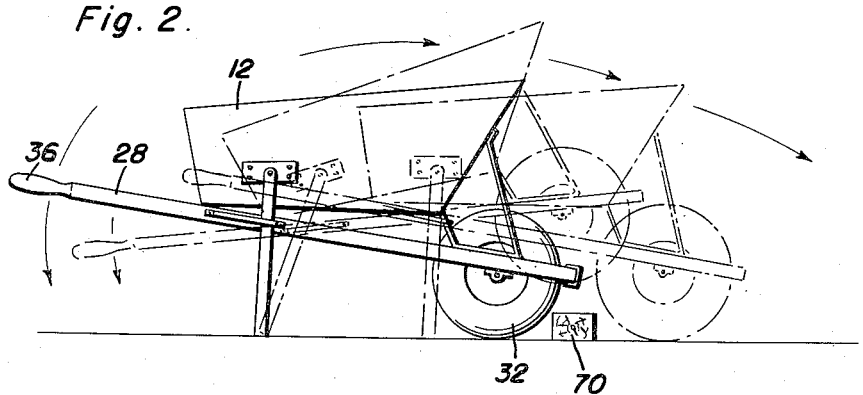
Figure 3:
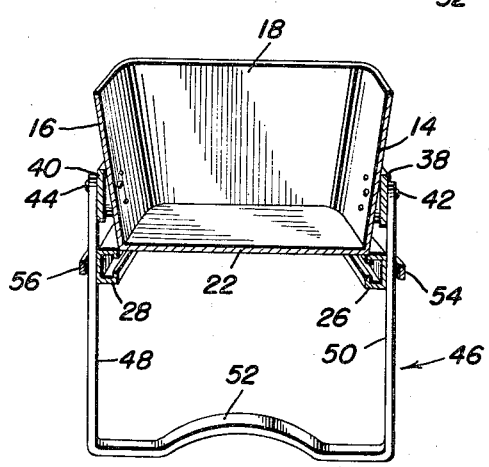

These, together with the various ancillary objects and features of the invention, which will later become apparent as the following description proceeds, are attained by this wheelbarrow booster, a preferred embodiment of which has been illustrated in the accompanying drawings, by way of example only, wherein:

Figure 1 is a perspective view of the preferred embodiment of the wheelbarrow booster showing it in attachment upon a wheelbarrow;

Figure 2 is a side elevational view of the wheelbarrow booster, and showing in dotted lines, various positions the wheelbarrow will assume when the wheelbarrow booster is used to aid the wheelbarrow in moving over an obstacle; and, Figure 3 is a vertical sectional view as taken along line 3—3 in Figure 1, and showing the connections between the wheelbarrow booster and the wheelbarrow in greatest detail.

With continuing reference to the accompanying drawings wherein like reference characters designate similar parts throughout the various views, numeral 10 is used to generally designate a wheelbarrow upon which the wheelbarrow booster comprising the present invention is to be secured. The wheelbarrow is of conventional design and consists of an open top receptacle 12 having spaced sides 14 and 16 together with a rear 18 and a rounded front portion 20. The four sides of the container are joined together by a bottom panel 22. The receptacle 12 is suitably supported as by brackets 24 upon a pair of substantially parallelly disposed longitudinal strength members 26 and 28.

The strength members 26 and 28 are of preferably channel shape and are joined at their front ends by a cross brace 30. Between the strength members 26 and 28 is journaled a suitable axle upon which a wheel 32 is mounted. The rear ends of the longitudinal strength members are provided with handles 34 and 36 respectively.

A pair of reinforcing members 38 and 40 are secured to the oppositely disposed sides 14 and 16. These reinforcing members are approximately rectangular in shape and may be thicker at the bottom thereof than at the top in order to compensate for the shape of the downwardly converging sides 14 and 16 of the container 12. These members 38 and 40 may be bolted, riveted or otherwise secured to the sides of the container 12. By means of suitable pins 42 and 44, a substantially U-shaped member, generally designated by reference numeral 46 is rotatably mounted to the sides of the wheelbarrow through the reinforcing members 40 and 38. This U-shaped member comprises substantially parallelly disposed legs 48 and 50 and a base 52 having, if desired, an off-set portion therein.

A pair of stop members 54 and 56, the parallelly disposed legs of which have their ends bent outwardly as at 58 and 60 in Figure 1, are secured by bolting, riveting, or other manner of securing to the longitudinal strength members 26 and 28. It is to be noted that the parallel legs 48 and 50 of the U-shaped member 46 extend through and are encompassed by the brackets 54 and 56 on three sides, and the strength members 26 and 28 on the fourth side.

Referring now to Figure 2, when the wheel 32 of the wheelbarrow encounters an obstacle such as a log, as is indicated at 70, the operator need press down on the handles 34 and 36 until the pivotally mounted U-shaped member 46 touches the ground. Then, he may press on the handles until the wheel rises up and over the log, after which he may ride forward on the pivotal displacement of the U-shaped member 46 until he is over the obstacle after which he may then let the wheel down.

Since from the foregoing, the construction and advantages of this wheelbarrow booster are readily apparent, further description is believed to be unnecessary.

However, since numerous modifications and equivalents will readily occur to those skilled in the art after a consideration of the foregoing specification and accompanying drawings, it is not intended to limit the invention to the precise embodiment shown and described, except as required by the scope of the appended claim.

Having described the invention, what is claimed as new is:

In combination with a wheelbarrow including an open top receptacle mounted upon spaced longitudinal strength members, a wheelbarrow booster comprising a substantially U-shaped member having the ends of its substantially parallel legs pivotally secured to oppositely disposed sides of said receptacle and stop means secured to said strength members for limiting the movement of said U-shaped member, said stop means comprising substantially U-shaped brackets having the ends of the substantially parallel extending legs bent outwardly, said ends of said legs being fastened to said strength members, said legs of said U-shaped member being encompassed by said brackets on three sides and by said strength members on the fourth side.

TOM THOMAS.

REFERENCES CITED

The following references are of record in the file of this patent.

UNITED STATES PATENTS

| Number | Name | Date |
|---|---|---|
| 217,864 | Dolan | July 29, 1879 |
| 269,248 | Wetmore | Dec. 19, 1882 |

FOREIGN PATENTS

| Number | Country | Date |
|---|---|---|
| 140,742 | Great Britain | Nov. 18, 1920 |